United States Patent [19]

Task et al.

[11] Patent Number: 4,606,127
[45] Date of Patent: Aug. 19, 1986

[54] LARGE PATTERN TRANSPOSING

[75] Inventors: Harry L. Task, Dayton; Michael B. Tutin; William N. Kama, both of Huber Heights, all of Ohio

[73] Assignee: The United States of America as represented by the Secretary of the Air Force, Washington, D.C.

[21] Appl. No.: 729,390

[22] Filed: May 1, 1985

[51] Int. Cl.$^4$ .......................... G01B 3/00; B43L 5/00; B43L 13/00
[52] U.S. Cl. ...................... 33/1 G; 33/1 B; 33/15 B; 33/562; 33/18.3
[58] Field of Search .............. 33/1 B, 1 A, 1 K, 1 G, 33/15 B, 1 CC, 18 C, 562, 563, 565

[56] References Cited

U.S. PATENT DOCUMENTS

| 1,428,582 | 9/1922 | Deitz | 33/192 |
| 2,697,234 | 12/1954 | Sturdevant | 7/5.3 |
| 3,059,233 | 10/1962 | Guarino et al. | 33/1 CC |
| 3,795,053 | 3/1974 | Burke | 33/1 B |
| 4,336,653 | 6/1982 | Stanton | 33/1 B |
| 4,344,231 | 8/1982 | Martinez | 33/494 |
| 4,466,191 | 8/1984 | Frederick | 33/1 B |

FOREIGN PATENT DOCUMENTS 590101  6/1925  France ................................ 33/494

Primary Examiner—Willis Little
Attorney, Agent, or Firm—Donald J. Singer; Gerald B. Hollins

[57] ABSTRACT

An image layout arrangement suitable for transposing small template located images into large work surface located images with any required degree of image resolution and detail, using simple, low-cost tools. An exemplary layout of aircraft images to a runway surface for use in enhancing air base survivability is included and employs point-by-point image transposition according to a plurality of point locating arrangements.

18 Claims, 3 Drawing Figures

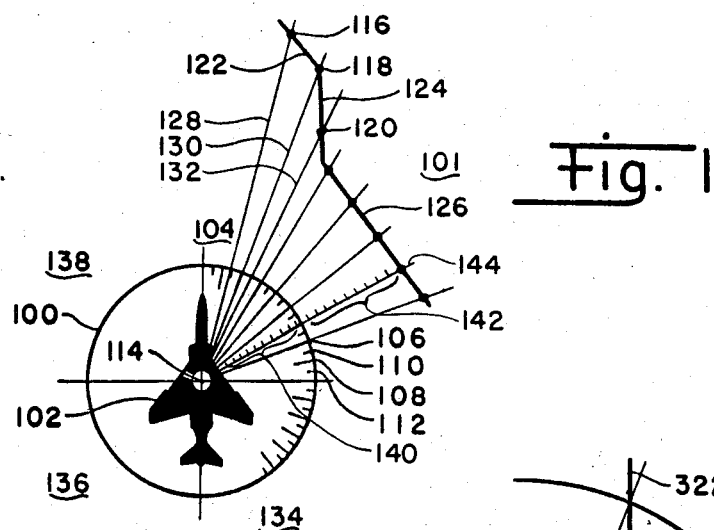
Fig. 1
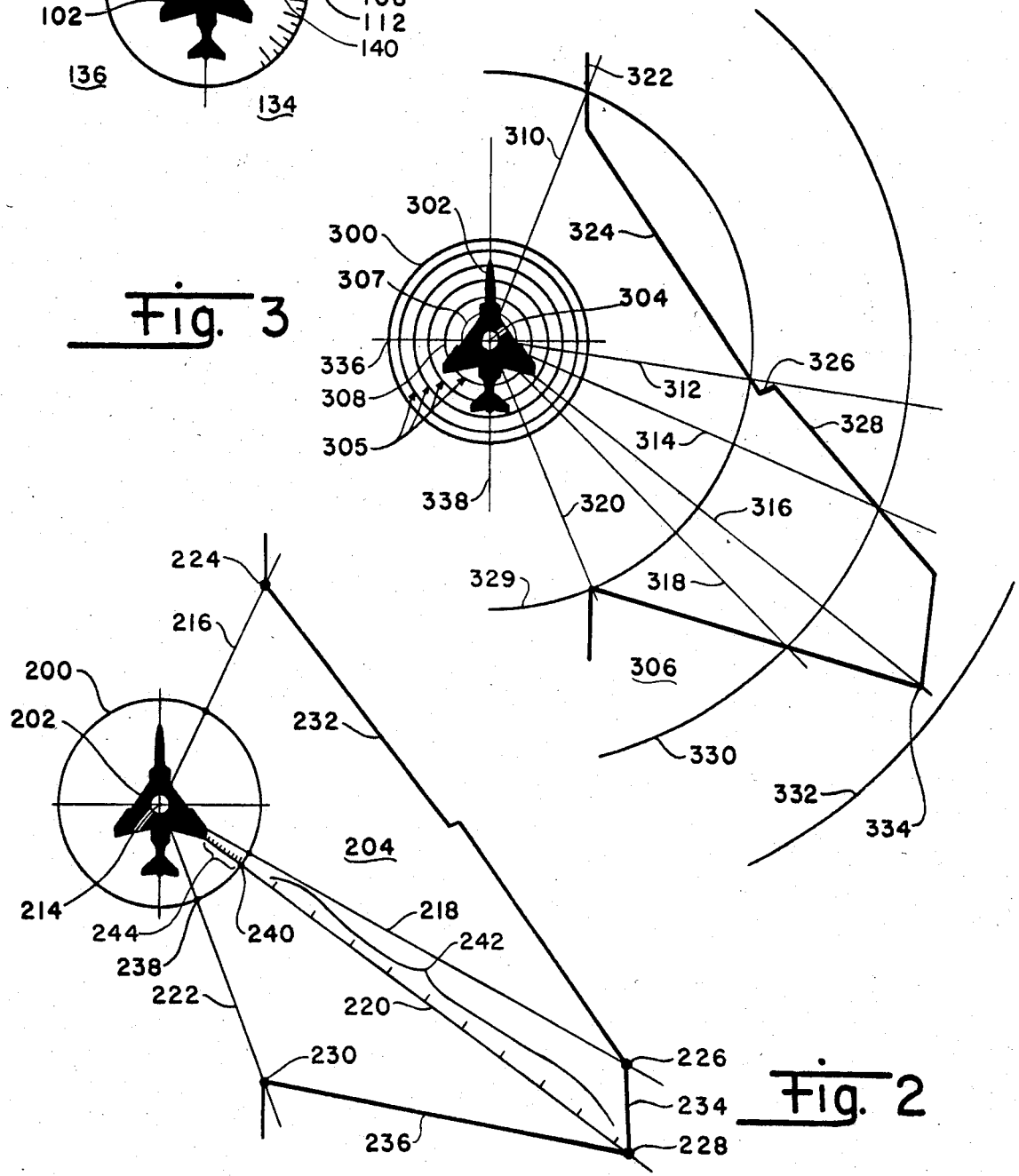
Fig. 3
Fig. 2

LARGE PATTERN TRANSPOSING

RIGHTS OF THE GOVERNMENT

The invention described herein may be manufactured and used by or for the Government of the United States for all governmental purposes without the payment of any royalty.

BACKGROUND OF THE INVENTION

This invention relates to the field of pattern layout wherein a desired final pattern is constructed from a template which carries a reduced size image of the desired pattern.

For enhancing the prospect of military air base survivability in the presence of enemy aircraft and missile action, it is currently considered desirable to employ deceptive and disruptive markings on aerially visible portions of the air base such as taxi strips, hangar roofs, ramp areas, and even runway surfaces. These deceptive markings are often in the form of painted images which may resemble aircraft, rocket or gun emplacements, and other military hardware. In addition to suggesting the presence of defensive equipment, such deceptive and disruptive images can also be employed to conceal and confuse the real identity of a particular air base area and to suggest the presence of attractive targets in benign or little-used areas of the air base. By means of such images, for example, a little-used ramp area may be arranged to appear as an aircraft parking facility or as an area containing buildings and other structures and a runway or other prime target area may be suggested to contain previous military damage and other obstructions. Deceptive markings or images of this type are considered to be effective against both manned aircraft where the viewing is performed directly by a human observer and also against cameras of either the electronic or film type where the viewing is done at a remote location. Such deceptive and disruptive images are also considered to be effective against satellite reconnaissance equipment wherein images are either transmitted in real time or are recorded for later transmission to an earth station. The use of deceptive and disruptive images is of course not limited to air bases and can be applied to other civilian and military targets including long range missile sites.

The images used in these deceptive markings may be on the order of 50 feet in diameter or even larger, depending upon the equipment being represented or the surface being concealed. In many cases it is necessary that the pattern used in preparing such images be reasonably accurate and that the final pattern image be repeated several times with good visual precision. The detection of small differences between adjacent aircraft which purport to be of the same type would be an easy task for a trained image analyst, for example. The realization of deceptive images of this type is therefore preferably accomplished by some means which offers reasonable accuracy, convenient portable size, good image repeatability, reasonable working speed, low cost, and the use of ordinary and easily available ancillary tools.

Images of this type may also be used to conceal movable objects such as vehicles, or be employed in movable decoy form for enhanced deception capability. Pattern layout arrangements of this same general type could also be useful in non-military settings for such purposes as laying out gardens, decorating buildings, providing signals for use by aviators, decorating park and recreational facilities, arranging the flash card patterns used for athletic events productions, and with smaller size images, in decorating vehicles such as the popular truck van. It is especially significant to note that the disclosed pattern transposing arrangement can be used on horizontal, vertical or inclined surfaces and can be used to at least some degree on non-planar or curved surfaces.

The pantograph, an instrument for use in the mechanical copying of patterns to a selected scale factor has of course been in the pattern layout art for many years. The pantograph provides a means by which a small size pattern may be used in reproducing a larger size image, and such devices are well suited to the moderate sized work pieces that might be contained within the bounds of a table top or even a small room. These devices become unwieldy and mechanically impractical for images of the above-indicated size, however.

Apparatus employing the pantograph principle for a variety of purposes is known in the patent art, as is illustrated by U.S. Pat. No. 1,428,582, issued to F. W. Deitz. The Deitz invention concerns a quick equalizing marker wherein the marking devices such as pencils are attached to successive pantograph arm junctions in order that lines having uniform separation distance can be drawn. Such lines might for example, be used as a musical scale or in drawing a set of steps. The setting of a desired line separation distance for any two of the Deitz marking devices achieves a similar line separation for the remaining marking devices. The Deitz apparatus can alternately be used to expand the size of an image by omitting the marking devices from one or more of the intermediate pantograph junctions so that the achieved marks are separated by a larger distance than the original marker separations—in the manner which is commonly achieved with simple pantograph devices.

Devices employing angular scales and movable arms which are rotationally alignable with objects are also common in the patent art, and are exemplified by the patent of M. W. Sturdevant, U.S. Pat No. 2,697,234. The Sturdevant invention shows a position locating device which is based upon the concept of identifying the desired position by way of the intersection of three line of sight vectors to predetermined landmark objects. A graduated degree scale in the Sturdevant invention also allows prepositioning of the sighting arms in accordance with recorded data. The Sturdevant invention also includes a graduated linear scale on each of the sighting arms; this scale is indicated to serve the function of allowing measurement of physical objects such as a fisherman's catch, rather than being used in the position determining or a pattern measurement function.

The use of secondary work surface patterns tending to blend into and become confused with the shape of a three-dimensional primary patterns such as an aircraft is shown in the patent application of John C. Bridenbaugh et al, Ser. No. 06/622,379, filed June 20, 1984, by the U.S. Air Force under the title of "Deception Pattern for Camouflage". The Bridenbaugh et al appliction discloses the use of shadow-like patterns located on a runway or other work surface and includes the use of repeated salient features of the shadow pattern image in order that a deceptive image acceptable from several viewpoints, be generated.

The use of radial lines originating in a central point and radiating outward from the central point to intersect with points of an image such as the outline of an aircraft is shown in the patent of Robert P. Stanton, U.S. Pat. No. 4,336,653. The thrust of the Stanton invention concerns the conversion of measurements from a first to a second system of measurement units, however. The aircraft outline example is used in the Stanton patent to illustrate an invention application involving measuring the size of several image details once a single dimension of the image is known in value.

The above patent references identify some of the elements of the present large pattern transposing invention, but however employ these elements for different functional purposes. The patent art has therefore fallen short of describing an arrangement for transposing large patterns such as might be suitable for the above-suggested military and commercial uses.

SUMMARY OF THE INVENTION

An object of the present invention is to provide a convenient arrangement for laying out large patterns usable in changing the appearance of a work surface area.

Another object of the invention is to provide a means for configuring large patterns through the use of templates or pattern layout guides which are relatively small in size and easily transported and stored.

Anothe object of the invention is to provide a plurality of arrangements by which a small image located on a template can be transferred to a larger work surface area.

Another object of the invention is to provide a large pattern layout arrangement which may be used for military purposes such as air base protection and for commercial purposes such as laying out a formal garden.

Another object of the invention is to provide an arrangement by which an image contained on a template can be expanded to different size work surface images.

Another object of the invention is to provide a pattern layout arrangement which needs only a template and a simple linear measuring tool to achieve pattern layout.

Another object of the invention is to provide a pattern layout arrangement which can be used with either uniform density silhouette image templates or with templates of varying image density, such as a photograph.

Another object of the invention is to provide a pattern layout arrangement which may be employed to generate either silhouette or varying density work surface patterns.

Another object of the invention is to provide a pattern layout arrangement which is operable with numerically recorded data without the use of a template pattern.

Additional objects and features of the invention will be understood from the following descriptiion and the accompanying drawings.

The recited and other objects of the invention can be achieved by locating a template member against a central portion of a work surface, extending a flexible tension member radially outward over the work surface from a reference point located on the template member, aligning the extended tension member with successive alignment indicia located on the template or the work surface, extending the radial distance between the reference point and each intersection of the extended and aligned tension member with identified points of the first image radially outward from the first image by a predetermined extension factor to respective second image points located on the work surface, and connecting the second image points on the work surface into patterns enlarged of and resembling corresponding patterns located at the first image on the template.

BRIEF DESCRIPTION OF THE DRAWINGS

FIG. 1 shows one arrangement of the invention wherein a template residing small image is partially transposed into a work surface image by way of uniform angularly displaced samples.

FIG. 2 shows another arrangement of the invention wherein a template image is transposed by way of salient feature projection onto the work surface.

FIG. 3 shows the transposing of a template image to a work surface image by way of salient feature locations being reckoned with respect to concentric circle scales and feature positioned radial references.

DETAILED DESCRIPTION

In FIG. 1 of the drawings an image of the F-4 aircraft used by the U.S. Air Force and U.S. Navy for tactical combat missions is shown. The FIG. 1 F-4image 102 is shown to reside on a template 100 which is to be employed for constructing a larger, actual size image of the F-4 on a work surface. The actual size image is indicated generally at 101.

The template image 102 in FIG. 1 includes a reference point 114 which in FIG. 1 is shown located near the geometric center of the template image 102. The template 100 also includes a graduated angular measuring scale 104 the purpose of which will become apparent below, the scale 104 has major graduations such as are shown at 106 and 108 and minor graduations such as are shown at 110 and 112. The major graduations 106 and 108 in FIG. 1 are indicated to occur at ten-degree intervals, while the minor graduations 110 and 112 occur at the intervening five-degree interval positions. Other angular measuring scales of higher or lower resolution could, of course, be employed with the FIG. 1 template as will also become more apparent below. The graduations at 104 are preferably extended into the second, third, and fourth quadrants of the template 100 as is shown at 134, 136, and 138. The abbreviated showing of the graduations in the first quadrant of FIG. 1 at 104 is accomplished for drawing simplicity and ease of understanding the invention; a practical embodiment of the invention would require at least graduations in the second quadrant at 134.

A portion of the work surface image that can be achieved through use of the template 100 is shown at 101 in FIG. 1; this portion includes line segments 122, 124, and 126, representing an engine nacelle area of the F-4 aircraft. The line segment 122 represents the air inlet portion of the nacelle, while the line segment 124 represents the nacelle side surface and the line 126 represents the leading edge of the F-4 wing.

In the FIG. 1 image transposing arrangement the location of points which determine lines 122, 124, and 126 in the work surface image 101 is geometrically fixed by the radial lines 128, 130, 132, and so on which are periodically positioned in accordance with the measuring scale 104 and by radial distances measured along these lines from the reference point 114.

Radial distance along the line 128 for example, to locate the point 116, is determined by a measure of distance between the reference point 114 and the point where the line 128 crosses the black to white transition at the corner of the engine nacelle structure in the template image 102. If this nacelle corner to reference point distance is called the template image radius, then the distance from the reference point 114 to the working surface image point 116 is determined by multiplying the template image radius by an extension factor or a multiplying factor which is selected to achieve the desired work surface image size.

If the image 102 in the template 100 is one five-hundredth of the size of a real F-4 aircraft, for example, the desired extension factor or multiplying factor would have a value of 500 in order that the achieved work surface image have a real-life F-4 aircraft size. The extension factor can, of course, be increased or decreased above the real-life size in order that the represented object conform to any desired overall dimensions. This flexibility may be especially desirable when the invention is employed in non-military uses, such as in laying out the seat locations for football flash card displays where the same display may be desirable in a number of differently sized stadiums.

Distance measurement along the radial lines 128-132 in FIG. 1 may be achieved in a plurality of manners, including the use of a commercial measuring tape such as the familiar coiled steel tape, the use of rope, string or wire having tied knots, painted graduations, or other marking indicia along the length thereof, the use of high technology measuring equipment such as laser beam interference instruments as are used in the surveying art, and other measuring techniques as are known in the measuring art. One measuring arrangement for distances along the radial lines is shown in FIG. 3 of the drawings and is described below. The steel tape, rope, string and wire and other tensile member measuring techniques can of course combine the functions of template point to work surface point alignment and radial measurement into a single positioning of the tensile member.

Typical radial distance measurement graduations as might appear on a tape measure or as might be denoted by knots or marks along such a string or wire tensile member are shown at 140 and 142 on the line 144 in the FIG. 1 arrangement of the invention. The graduations 140 and 142 can be a part of one continuous scale or can be in accordance with segregated scales wherein the graduations 140 are used in connection with the template 100 image 102 and the graduations 142 are used in connection with the work surface image 101 as preferred. Segregation of the graduation 142 from the graduations 140 presumes some form of reckoning of the graduations 142 for the work surface image back to the reference point 114. Where the graduations 140 and 142 are all part of a single scale such reckoning is inherent in the single scale. Graduations are, of course, not required when laser or other high-technology measurement arrangements are used with the invention.

For appreciating the concept of the FIG. 1 embodiment of the invention the lines 128, 130, 132 and so on may each therefore be considered to have resulted from different positions of the steel tape or tensile member used to locate angular and radial positions in the image 101. For the sake of drawing convenience and clarity, however, the graduations involved in each of these lines or tape positions are shown in representative form only at 140 and 142 in FIG. 1.

The underlying concept of the FIG. 1 pattern layout arrangement involves the plotting of one work surface image point for each selected one of the periodically occurring angular measuring scale graduations and thereby results in plotting along radial lines such as the lies 128-132. Following this plotting of indivdiual points, the work surface image lines such as the lines 122, 124, and 126 connecting the individually plotted points can be drawn to indicate the periphery of the work surface image.

A need of the FIG. 1 pattern layout arrangement is therefore that sufficient resolution is employed in the angular scale 104 to reasonably convey the shape of the image from the template 100 to the work surface. It is apparent however that certain of the points in the FIG. 1 work surface image 101 are not needed, notably the plural points long the straight line 126. These plural points could therefore be omitted with little loss of work surface image accuracy. The number and angular spacing of the radial lines 128-132 can of course be adjusted to suit the resolution of the image and the image portion being transposed close angular spacing and high resolution are desirable for small, intricate features of the template image 102 in such an arrangement.

Thus far it has been presumed that the template 100 is located on the work surface at the center of the work surface image and is fastened to the work surface adhesively or by weights or piercing members such as nails or other arrangements in order that pivoting of a flexible tensile measuring member about the reference point 114 can occur conveniently. Variations of this arrangement are of course possible, including a mounting of the template 100 on some surface parallel to the work surface, or alternately, mounting of the template on a surface that is intentionally made non-parallel with the work surface in order that a desirable distortion of the image 102 appear in the image 101. Such distortion might for example, be used to give the impression of perspective or a view from some angle other than that of the viewer with respect to the work surface image.

The reference image radius values in FIG. 1 are determined, that is, once the distances from the center 114 to the edges of the silhouette image 102 are established, the presence of an image 102 is no longer necessary for completing the work surface image 101. According to an extension of this concept therefore, the work surface image 101 can be reproduced by rotating the radial measurement device such as the tensile measure, to successive angular positions on the scale 104 and locating the work surface image points 116-120 in the required position from a recorded table of extended reference image radius values. The reference image radius values in this arrangement could therefore be obtained once and recorded for use in producing a large number of work surface images. The extension or multiplication of reference image values by the predetermined extension factor can, of course, be accomplished as a separated operation prior to use of the recorded table.

Although the image 102 in FIG. 1 is shown in the form of a silhouette of constant image density, use of the described technique with template and work surface images of varying density, such as a photograph, is also feasible. Light reflection patterns as observed in a photograph, may be treated in the same manner as the silhouette circumference described for the FIG. 1 arrangement with each radial line of the type shown at 128–132 thereby potentially identifying the radial location of several work surface image points rather than the single point as illustrated in FIG. 1.

A variation of the FIG. 1 image layout arrangement is shown in FIG. 2 of the drawings wherein a template 200 carrying an image to be reproduced 202 and a centrally located image reference point 214 are shown. Also represented in FIG. 2 is a portion of the work surface enlarged image is transposed from the template image 202, the enlarged portion 204 represents a major part of the right wing of the F-4 aircraft shown in the template image 202. The work surface image 204 in FIG. 2 is transposed from the template image 202 once again by means of radially directed lines such as the lines 216, 218, 220, and 222. These lines, however pass through the image reference point 214 and points of inflection or salient feature points of the image 202 in extending outward to the work surface in the FIG. 2 arrangement of the invention. The radial lines 216–222 in FIG. 2 are therefore similar to the lines 128–132 in FIG. 1, except for being deliberately located at the salient feature points of the template image 202-rather than being located periodically in accordance with the graduate angular scale 104 used in the FIG. 1 arrangement of the invention.

The location of radial lines defining work surface image points at salient feature points of the image 202 is especially desirable for transposing an image such as the F-4 aircraft silhouette which has clean, sharp features that are principally joined by straight lines. Such work surface lines can often be located by only two transposed points from the image 202 as is shown, for example, in FIG. 2 by the points 228 and 230 for the trailing wing edge line 236.

The location of the points 224, 226, 228 and 230 in FIG. 2 along the salient feature radial lines can be determined by the above-described extension of distances along the lines 216, 218, 220 and 222 again using a predetermined constant multiplying factor in order to obtain the desired work surface radius and image size.

Graduations as might appear on a steel tape or tensile member are shown at 242 and 244 along the line 220 in FIG. 2 of the drawings. These graduations may be uniformly spaced as described in connection with the graduations 140 and 142 in FIG. 1 or may be spaced to include consideration of an appropriate multiplying factor as is suggested by the varied spacings in the FIG. 2 drawing. As was also indicated in connection with the FIG. 1 arrangement of the invention, the lines 216, 218, 220 and 222 may be considered to be the loci of the tape or tensile member used in determining the locus of the points 224, 226, 228 and 230 in FIG. 2 in an alternate appreciation of the invention.

The points 238 and 240 in FIG. 2 indicate a possible arrangement for dispensing with the presence of the image 202 in laying out the work surface image 204 according to a manner which relates to the recorded table of values described in connection with FIG. 1. In this arrangement the points 238 and 240 designate the radial location of lines 222 and 220, respectively; these locations together with the table of radial distances computed as described above for the FIG. 1 arrangement of the invention, allow determination of the points 224–230 without use of the image 202. The image 202 therefore needs to be used only to formulate the a table of values and thereafter only the points 238, 240 and the table of values is needed.

Plotted arrangements other than the template and point pattern shown in FIG. 2 could, of course, be used to obtain the image 204; one such arrangement, for example, might include the recording of both radial distance and angular position for the salient feature radial lines followed by reproducing the angular positions with the aid of a surveyor's transit or other angular measuring instrument. Even in such arrangements, of course, in keeping with the FIG. 2 concept of the invention, the radial lines 216–222 would continue being located at salient feature points of the images 202 and 204.

The word "salient" as used in describing the FIG. 1 and FIG. 2 arrangements of the invention is of course, not limited to outwardly extending points, but should be understood to also include other prominent or discernible features of the images such as the inward point transposed by the line 222. Other points in the pattern being transposed including points of curve interest or points of image density change, and indeed any point of intersect in a pattern can be transposed in the FIG. 2 described manner.

For use with template images having more complicated features such as the silhouette of the F-5 aircraft, wherein a large number of wing mounted tanks and weapons are present, the radial lines for locating work surface image points in the FIG. 2 arrangement of the invention may be more closely spaced in the regions of high image detail and non-straight line outline features. The number of extension radial lines can also be in excess of the periodic number which might be employed in a FIG. 1 arrangement of the invention. In a related manner, the concepts of the FIG. 1 and FIG. 2 arrangements of the invention can be combined—with widely spaced radial lines, being associated with areas of low image detail and periodic radial lines in accordance with an increased resolution angular measurement scale 104, being used in areas of greater image detail.

FIG. 3 of the drawings shows a third template 300 carrying a third image pattern 302, having a centrally located reference point and radial distance measuring pivot point 304, and incorporating a family of concentric rings 305 which may be used in determining the reference image radius values along each of the radially directed extension lines 310, 312, 314, 316, 318, and 320.

The FIG. 3 arrangement of the invention also includes a second concentric ring family 306 which is located on the work surface that is to receive the transposed image. The concentric ring families 305 and 306 are, of course, each uniformly spaced with respect to radial separation distance with the separation between the rings 329, 330 and 332 being a constant multiplication factor or extension factor of the separation between the rings 307, 308 and so on. The use of the ring families 305 and 306, of course, dispenses with the need for measurement use of a tape measure, flexible string, or other radial measuring apparatus in the pattern transposing invention, since distances between corresponding rings in the families 305 and 306 can be estimated with reasonable accuracy. Such estimating might for example place the trailing edge wingtip of the illustrated F-4 aircraft at a seven tenths point between two rings in the families 305 and 306 as is illustrated at 334. The rings in the families 305 and 306 can of course, be spaced in accordance with image resolution needs in a particular embodiment of the invention. Individual rings in the family 305 can moreover be spaced at differing radial distances as needed for reproducing high and low detailed portions of the image 302, so long as corresponding spaces according to a uniform multiplication or extension factor are also used in the family 306.

It is of course possible to combine use of one of the two families of rings 305 and 306 with the tape measure or other linear measuring devices described in connection with FIGS. 1 and 2 of the drawings, thereby requiring use of the tape measure scale for only the omitted set of rings, rather than for both the template image and the work surface image. In similar fashion, the concepts described in connection with the FIG. 3 arrangement of the invention can also be combined with the concepts described for FIG. 1 and FIG. 2, such as the use of salient feature determined radial lines or the use of periodally located angular marking scales. The tape measure or a tensile member or some other linear means or straight-edge device is needed for performing the radial alignment of points in the FIG. 3 arrangement of the invention, as was described in connection with FIGS. 1 and 2.

The cross-hairs or coordinate axes shown at 336 and 338 in FIG. 3 have not been described in connection with the FIG. 1-3 arrangements of the invention, such coordinate axes are principally shown as a convenience in orienting the template and except for being coincident with the angular marking graduations in FIG. 1, are otherwise unnecessary in practicing the invention.

Several variations are possible within the spirit of the invention, such variations include use of a non-centrally located reference point in lieu of the described reference points 114, 202, and 304. The term "proximate" may be used to describe a reference point location which is either within the template images as is shown in FIGS. 1-3 or alternately is located non-centrally and somewhere adjacent the template image. Non-centrally located reference points could of course, be useful for providing asymmetric work surface images or in obtaining a perspectively distorted version of the template image, or in order to locate the reference point in a desirable position with respect to portions of the template image having high detail content.

According to another possible variation of the invention, a non-linear extension or multiplying factor could be employed between the template and work surface images to achieve work surface image distortion which might be useful, for example where the desired images contain large amounts of detail at the image periphery with little detail at small radius values; such a non-linear extension factor might, for example, take on greater magnitude for increasing values of template image radius away from the reference point. Yet another variation of the invention could be achieved through the use of curved surfaces for either the template image or the work surface image, the combination of curved surfaces and non-linear extension factors providing a large array of possible image variations.

For the commonly encountered situation where a full-sized template for generating an image is impractical, the present invention provides a convenient and low-cost arrangement for the layout of large images. The disclosed arrangement is usable with images of any size and can employ photographs, silhouettes, drawings, or numerous other forms of template images. The disclosed image layout arrangement is also suitable for use in non-horizontal and non-planar surfaces, and can be embodied using low-cost commonly available tools and throw-away materials where desired. The disclosed arrangement is also well suited for use in situations where accurate reproductions of a template image are needed, where multiple reproductions of the same image are needed, and where the combination of multiple and accurate images is needed.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Apparatus for transposing a small template image pattern to a larger pattern receiving work surface comprising:

a template member locatable within a pattern receiving area on said work surface and including a small size first image of the pattern to be transposed related thereon, said template member also having a reference pivot point located in a position proximate said first image thereon;

linear means originating at said reference pivot point and extendable radially and rotatably outward therefrom over said first image and said work surface for extending the locus of points in said small size first image to larger second image points radially aligned therewith and distal of said first image on said work surface;

first means for measuring first distance magnitudes along said extended linear means from said reference pivot point to the coincidence of said linear means with said first image points;

second means for measuring the magnitude of said second distances along said extended linear means from said reference pivot point to said second image points located on said work surface distal of said first image;

whereby the location of said larger second image points on said work surface is determined by radial alignment with said first image points and extended distance from said pivot point.

2. The apparatus of claim 1 further including means for marking said work surface at said second image points located along said linear means at successive rotational locations thereof.

3. The apparatus of claim 1 wherein said reference pivot point is located within the periphery of said first image on said template member.

4. The apparatus of claim 3 wherein said reference pivot point is centrally located within said first image on said template member.

5. The apparatus of claim 1 wherein said predetermined ratio factor has the same magnitude for each of said first and second image point pairs.

6. The apparatus of claim 1 wherein said means for extending includes mathematical multiplication means.

7. The apparatus of claim 1 further including means for indicating azimuth positions about said reference pivot point.

8. The apparatus of claim 7 wherein said means for indicating azimuth position includes a graduated angular scale.

9. The apparatus of claim 8 wherein said graduated angular scale is located about the periphery of said template member.

10. A method for transposing a small first deception pattern image on a template into an enlarged second deception pattern image on a work surface comprising the steps of:

locating said template member adjacent a central portion of said work surface;

extending a flexible tension member radially outward over said work surface from a reference point located on said template member;

aligning said extended tension member with successive alignment indicia located on one of said template and work surfaces;

extending the radial distance between said reference point and each intersection of said extended and aligned tension member with selected points in said first deception pattern image radially outward from said first deception pattern image by a predetermined extension factor to respective second deception pattern image points on said work surface;

connecting said second image points on said work surface into a deception pattern enlarged of and resembling the deception pattern of said template; and covering the area within said work surface image line pattern with surface overlay material of selected optical densities.

11. The method of claim 10 wherein said alignment indicia are predetermined graduations located on said template member and said identified points include salient points of said first deception pattern image.

12. The method of claim 11 wherein said work surface overlay material is paint of selected colors.

13. The method of claim 10 wherein said alignment indicia are previously recorded numerical value determined points located on one of said work surface and said template members.

14. The method of claim 10 wherein said alignment indicia and said selected points in said first deception pattern image are the same, tension member alignment being thereby determined by points of selected interest in said first image.

15. The method of claim 10 wherein said extending of radial distance includes multiplying the respective distances between said reference point and said first deception pattern image selected points by a constant multiplication factor to determine the magnitude of said extended distance and measuring said extended distance from said reference point.

16. Apparatus for transposing a small template image pattern to a larger pattern receiving work surface comprising:

a template member locatable within a pattern receiving area on said work surface and including a small size first image of the pattern to be transposed located thereon, said template member also having a reference pivot point located in a position proximate said first image thereon;

linear means originating at said reference pivot point and extendable radially and rotatably outward therefrom over said first image and said work surface for extending the locus of points in said small size first image to larger second image points radially aligned therewith and distal of said first image on said work surface;

first means for measuring first distance magnitudes along said extended linear means from said reference pivot point to the coincidence of said linear means with said first image points;

second means for measuring the magnitude of said second distances along said extended linear means from said reference pivot point to said second image points located on said work surface distal of said first image;

said first means for measuring and said second means for measuring comprising a single linear scale member.

17. The apparatus of claim 16 wherein said first means for measuring, said second means for measuring and said linear means comprise a tape measure.

18. The apparatus of claim 16 wherein linear means comprises a flexible cord member having length measuring marks disposed thereon.

* * * * *